United States Patent
Calabrese et al.

(10) Patent No.: US 10,374,404 B1
(45) Date of Patent: Aug. 6, 2019

(54) ELECTRICAL JUNCTION BOX ASSEMBLY

(71) Applicants: Christopher Calabrese, Ramsey, NJ (US); Evan Giannotti, Haworth, NJ (US)

(72) Inventors: Christopher Calabrese, Ramsey, NJ (US); Evan Giannotti, Haworth, NJ (US)

( * ) Notice: Subject to any disclaimer, the term of this patent is extended or adjusted under 35 U.S.C. 154(b) by 0 days.

(21) Appl. No.: 16/019,427

(22) Filed: Jun. 26, 2018

(51) Int. Cl.
*H02G 3/10* (2006.01)
*H02G 3/08* (2006.01)

(52) U.S. Cl.
CPC .............. *H02G 3/10* (2013.01); *H02G 3/083* (2013.01)

(58) Field of Classification Search
CPC   H02G 3/08; H02G 3/081; H02G 3/10; H02G 3/083; H02G 3/12; H02G 3/121; H02G 3/123; H02G 3/125; H02G 3/126; H05K 5/00; H05K 5/02; H05K 5/0204; H05K 5/0217
USPC ....... 174/480, 481, 50, 53, 57, 58, 502, 503, 174/62, 63, 61; 220/3.2–3.9, 4.02; 248/906
See application file for complete search history.

(56) References Cited

U.S. PATENT DOCUMENTS

| 3,588,017 | A | | 6/1971 | O'Brien | |
|---|---|---|---|---|---|
| 3,977,640 | A | * | 8/1976 | Arnold | F16B 2/241 248/542 |
| 4,140,293 | A | * | 2/1979 | Hansen | H02G 3/125 174/58 |
| 5,408,045 | A | * | 4/1995 | Jorgensen | H02G 3/126 174/503 |
| 5,841,068 | A | * | 11/1998 | Umstead | H02G 3/126 174/58 |
| 7,214,876 | B1 | * | 5/2007 | Haberek | H02G 3/126 174/135 |
| 7,214,877 | B2 | * | 5/2007 | de la Borbolla | H02G 3/126 174/50 |
| 7,642,471 | B2 | * | 1/2010 | Whitaker | H02G 3/126 174/480 |
| 9,024,185 | B2 | * | 5/2015 | Moldovan | H02G 3/086 174/54 |

* cited by examiner

*Primary Examiner* — Angel R Estrada
(74) *Attorney, Agent, or Firm* — W. Patrick Quast (57) ABSTRACT

An assembly including an electrical junction box and an accompanying shroud plate wherein the latter is aligned with the mounting elements found in a typical junction box so as to maintain a relationship between the shroud plate and the junction box such that when the assembly is installed, stray nails and/or screws used to secure sheetrock or the like to framing members such as wall studs does not penetrate a rear wall of the junction box or the surface covering of cables connected to the box.

11 Claims, 5 Drawing Sheets

ELECTRICAL JUNCTION BOX ASSEMBLY

FIELD OF THE INVENTION

This invention relates to an electrical junction box assembly wherein the assembly provides protection from damage to the box and one or more connecting cables.

BACKGROUND

The use of plastic junction boxes for making electrical connections within the frame work of a building, began in the early 1970's if not somewhat prior thereto. The development of romex type electrical cable led the way to the development of the plastic junction box and for many reasons it has become the preferable device utilized in the field.

The cables are routed into the interior of the box for subsequent hook up with switches, socket outlets and the like. Knock-outs are positioned at the intersection of a rear wall of the box with the top and bottom walls.

A typical cable will include two (2) insulated wires and a ground wire. When introduced into the rear of the junction box, the connections to the particular electrical device, for example, a switch or outlet, are normally effected at the rear of these devices. As such, the wires and the associated wire nut(s) are bunched at the rear and remain there after the placement of the outlet fixture in the wall cavity.

In many circumstances, multiple switches and/or sockets can be located in one junction box. This is accommodated through the ganging of the outlet devices into a single box which is expanded in width to accommodate the additional items.

The junction boxes are secured to the framing members that support the wall structure. Typically, these are vertical stud members which may be of wood or metal construction, the latter particularly used in commercial and institutional construction. These stud members and associated frame members and wall coverings, such as sheetrock, define the wall areas.

The stud members are nominally two inches by four inches (2"×4") (width versus depth). The actual finished wall stud product when made of wood can measure as little as 1⁷⁄₁₆"×3⅜". Metal studs run 1⅝" by 3¹⁄a". The typical thicknesses for the sheetrock covering for the wall cavity are ¼" and ½".

Cables that are to be connected to a particular junction box enter and exit that box through the knock-outs, positioned, once again at the interface between the back wall of the box and the top or bottom wall as required. As the cable runs through the framed building, it is dressed along or through various wall stud and other framing members. When it reaches a particular junction box where a connection is to be made, the cable is dressed along the wall stud approximately dead center, to ensure as required by applicable standards, the outside surface of the cable is not less than 1¼" from the nearest edge of the framing member.

Of course in dealing with electricity it is important from a personal as well as fire safety point of view that wiring in general be done to the highest standards so as to eliminate potential risks in these areas. It is important that the individuals who work in this area, electrical contractors, bring a breadth of learned knowledge and practical experience which insures consistency and assurances that these high safety standards are met.

These standards and recommended practices and guides have been developed in the United States by the American National Standards Institute. They are contained in a National Code which is reviewed and updated frequently to reflect new thinking, new devices and experiences so that any deficiencies that become apparent as contractors do their work day to day, can be addressed in the latest version of the Code. The standards embedded in the Code, if followed, ensure that contractors as they move from job to job, whether new construction or remodeling, hopefully, are not met with significant surprises requiring work that might not have been foreseen.

One of the particular Code requirements germane to the present invention is set out in Chapter 3, Article 300. This particular Article includes a Section 300.4 describing various techniques necessary to protect against physical damage to conductors including cables. At 300.4(D), it is stated that "the cable . . . shall be installed and supported [(by staples)] so that the nearest outside surface of the cable . . . is not less than 32 mm (1¼") from the nearest edge of the framing member . . . where nails or screws are likely to penetrate." And further in Code Section 300.4(D) it is stated that "[w]here this distance cannot be maintained, the cable . . . shall be protected from penetration by nails or screws by a steel plate . . . or equivalent at least 1.6 mm (¹⁄₁₆") thick."

In the case of connections of a romex cable to a plastic junction box, the cable must be formed by the contractor so as to move off center of the stud member and directed to the location of the knock-outs, again, at the rear wall interface at the top or bottom of the junction box unit. Although no specific distances are set forth in the Code as to the location of the last staple needed to secure the cable to the mid point of the stud member in relation to the junction box, typical experience of the trade locates that last staple approximately 2" to 4" from the top (or bottom) surface of the box. As the cable is directed to the knock-outs, it is apparent they are now positioned within this 1¼" safety space creating the concern addressed by the present invention. Again, the Code recognizes the need to protect cables that fall within this distance from the nearest edge in that they require that the "cable . . . be protected from penetration by nails or screws by a steel plate . . . or equivalent at least 1.6 mm (¹⁄₁₆") thick" as noted above.

Again, junction boxes are typically secured to a particular wall stud. However this framing member also provides support for the anchors used to secure sheetrock. The installation of sheetrock for a building typically occurs after the rough-in of the electrical work including the installation of the various junction boxes. The experience of electrical contractors, suggests that this activity, that is the installation of sheetrock, many times is not as precise and controlled as is necessary to avoid damage to electrical cables and junction boxes. It is not unheard of, that the sheetrock installation will result in the fastening members, typically metal screws designed for that purpose, are not precisely located along the center line of the supporting stud. Further, they can vary in length based on the work habits of the installer.

The junction box presently utilized in the trade is typically made from thermoplastic material. For so-called "deep boxes", the depth of the box runs 3.375". Around the perimeter of the boxes are two molded, visible guidelines set back either ¼" or ½" from the front face. These guidelines inform the electrical contractor where to position the junction box in relation to the front face of the stud members so that the face of the box is flush with the outside surface of the sheetrock when installed. Placement of the box in the wall cavity is approximate at best.

In a circumstance where ¼" sheetrock is to be applied, the deep box in effect would protrude into the wall cavity 3½"

from the outside face of the wall stud member. Although these wall stud members are nominally 3½" in depth, in time, as noted above these studs have been reduced by the manufacturing process to something less than 3½" and closer to 3⅜". As such, the outside surface of the rear wall of the junction box can be as close as ¼" from the inside surface of the sheetrock secured to the stud member at the rear of the junction box. With the thicker (½") sheetrock material the nominal clearance behind the back surface of the junction box and the inside surface of the sheetrock would be ½".

A junction box is typically supplied with means for securing the box to the stud member. This includes a fastening member mounting element that is formed as a part of the box in the molding process and is integral with the outside surfaces of the top and bottom walls. As purchased, the boxes typically include fastening members such as nails or screws already in place in the mounting elements on the top and bottom of the box. The mounting elements are sized to securely retain the fastening members as the box is being handled. The location of the mounting elements, as between the front face and back wall of the box, will vary depending on a particular manufacturer, but the basic design is the same.

Any proposed solution to the safety issues arising from the position of the cable(s) as they approach the knock-out entry points of the box, should not increase the installation time as presently experienced. Further, the plastic junction boxes presently employed have been in use for a considerable number of years and meet all the necessary requirements of the trade. So, there is no desire to modify the box itself to accomplish the purposes sought to be achieved by the present invention.

It is therefore a principal object of the present invention to provide a protective shroud in combination with the typical junction box now employed in the trade, that will prevent the penetration of the box and the array of one or more cables connected to the box by sheetrock screws or other fastening members employed in near proximity to the box and cable.

It is another object of the invention to provide a protective assembly that has a minimal impact, if any, on present installation time and costs.

It is still another object to provide a shroud box assembly design that is easily adaptable to accommodate the plurality of junction boxes available in the market.

BRIEF DESCRIPTION OF THE DRAWINGS

An understanding of the present invention, its objects, advantages, construction and operation can be had by consideration of the following specification including accompanying drawings which are described as follows.

DESCRIPTION OF THE PREFERRED EMBODIMENT

Figure 1A:
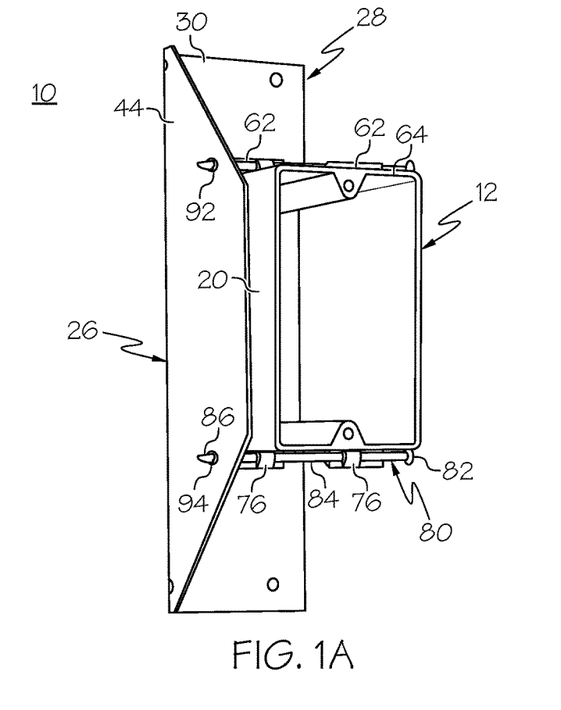
FIG. 1A is a perspective view of the assembly of the present invention.
Figure 1B:
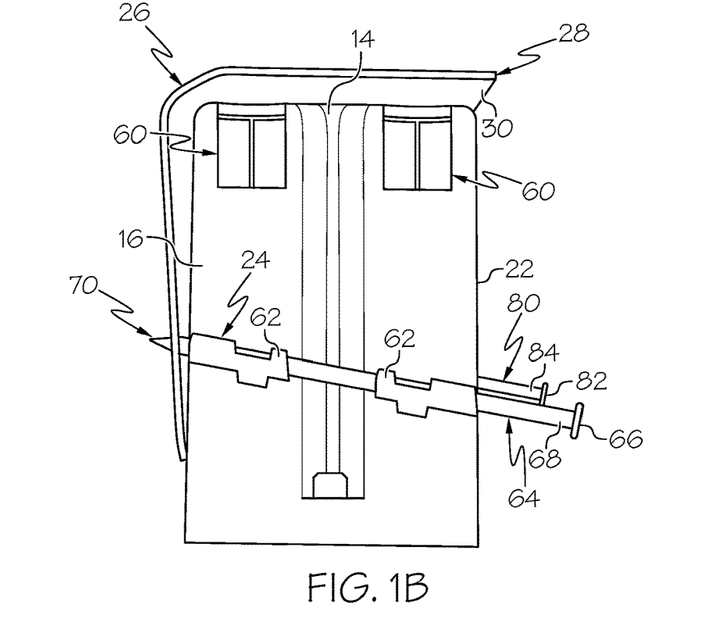
FIG. 1B is a top plan view of the assembly in accordance with the invention.
Figure 1C:
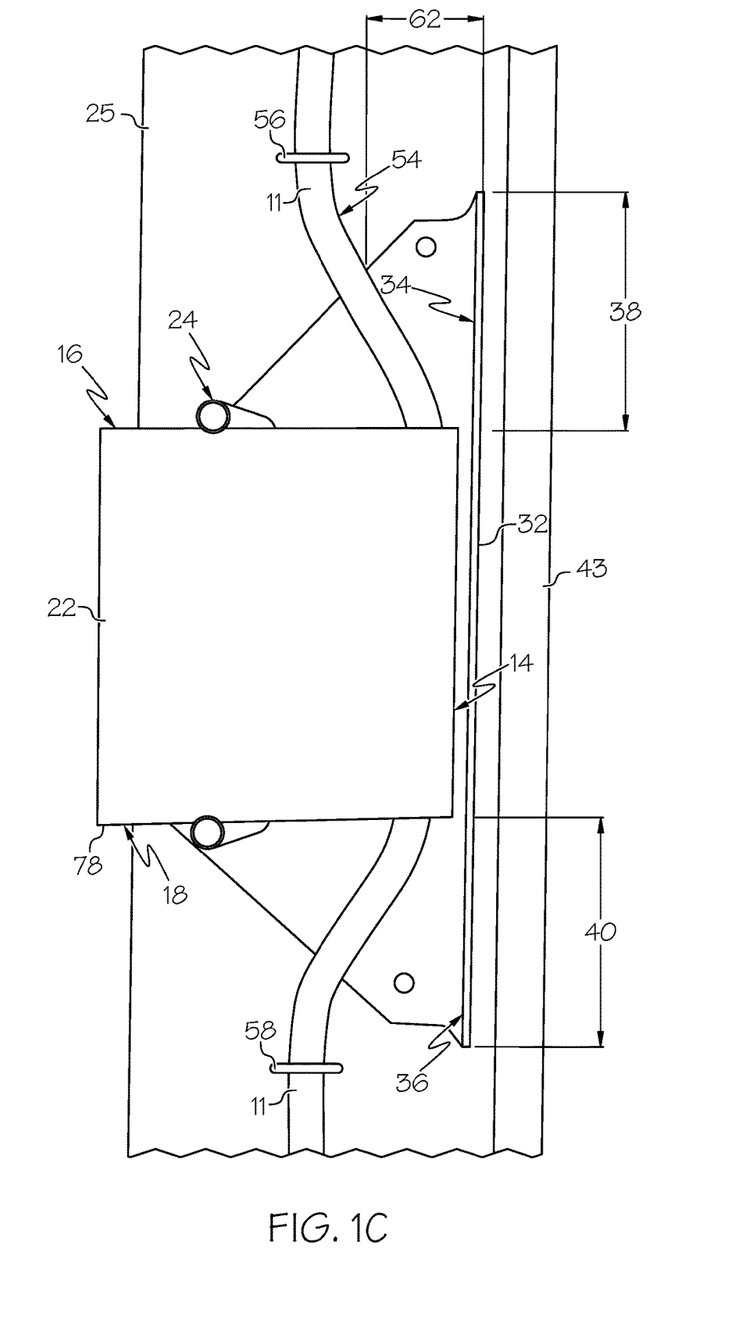
FIG. 1C is an elevation view from the left side of the assembly in accordance with the invention, in place on a framing stud.

Referring to FIGS. 1A, 1B AND 1C, there is shown an assembly 10 for protecting an electrical junction box and an array of one or more electrical cable(s) 11 (see FIG. 1C) connected to the junction box. The assembly 10 includes the junction box 12. Typically this is fabricated from plastic, but other material, e.g. a light gauge metal may be employed. The box includes a rear wall 14, a top wall 16, a bottom wall 18, a first side wall 20 and a second side wall 22.

The assembly further includes a first securing means 24, see FIG. 1B, for securing the assembly to a wall stud 25 (see FIG. 1C).

The assembly 10 further includes a shroud plate 26. Consistent with Code requirements, the shroud plate would be made of 1/16 inch metal although the invention envisions the use of an alternate material such as relatively impenetrable plastic as a possible replacement. The plate includes a first segment 28 with an inside surface 30. In a final assembly of the junction box 12 and the shroud plate 26, the inside surface 30 is positioned in close proximity to the rear wall 14 of the junction box.

The first segment 28 includes a first section 32 that in area is co-extensive with the rear wall 14; and, a second and third section 34, 36 extending from the first section 32 a respective predetermined distance, 38 and 40, above and below the top and bottom walls of the junction box, respectively. This predetermined distance in both cases, for a typical installation of cable, extends approximately two to four inches above and below the first section 32—to the approximate point of the nearest staple, 56 and/or 58, (see below). (Note the Code stipulates that the distance to the nearest staple can be as much as but no more than 8 inches. The two to four inches represents a compromise by a particular assembly provider to accommodate most tradesmen's expected best practices.)

The shroud plate 26 includes an additional segment 44. This is formed at right angles to the first segment and, when in place as part of the assembly, extends in the direction of the first side wall 20 from the rear wall 14 of the junction box.

Additional segment 44 includes angled sections 46 and 48. Each section includes respective angled edge surfaces 50 and 52.

As noted above, the Electrical Code requires that the cable 11 be protected when the outside surface, 54, nearest the closest edge of the framing member 25 is 1¼ inches or less. Further, it is the practice in the trade to locate the staple 56 and/or 58 as close to 2 to 2½ inches from the entry to the knockouts 60 on the top or bottom walls, 16 and 18. This distance varies with the individual contractor. The use of angled sections 46 and 48 enables the contractor to staple the cable as before while affording protection to the cable when it is located within the 1¼ inch distance, 62.

Figure 1D:
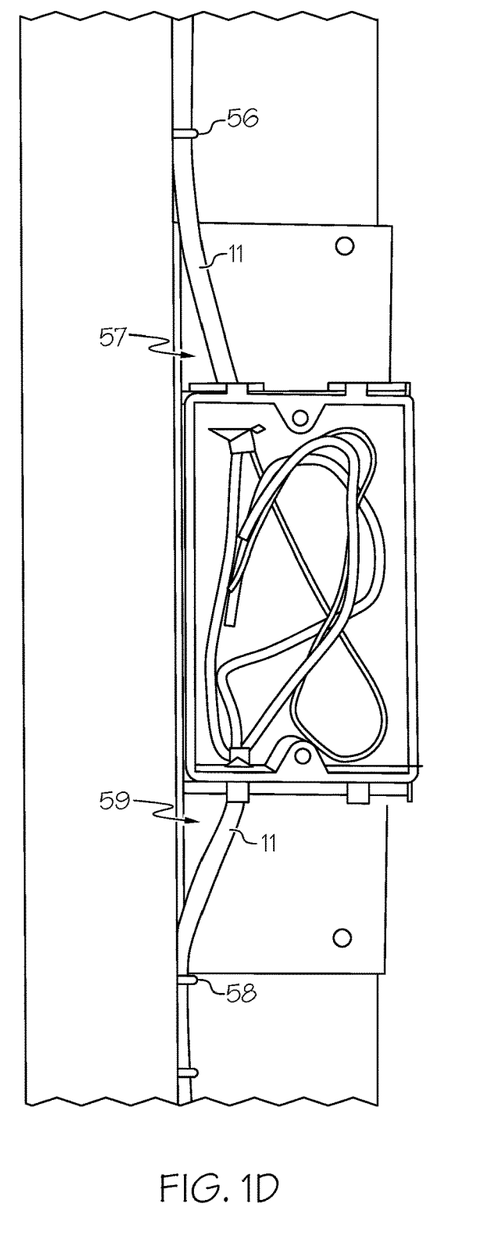
FIG. 1D is an elevation view from the front side of the assembly in accordance with the invention, in place on a framing stud.

The angled shape also precludes contact between the metal sections 46 and 48 and the cable, especially near the staples 56 and/or 58. If the sections 46 and 48 were rectangular in shape, this would result in a possible contact interface between the cable and the metal plate, near the staples, an occurrence to be avoided. The cable(s) is angled away from the stud 25 (see 57 and 59 in FIG. 1D) from the respective staple to the entry openings for the box.

Figure 2:
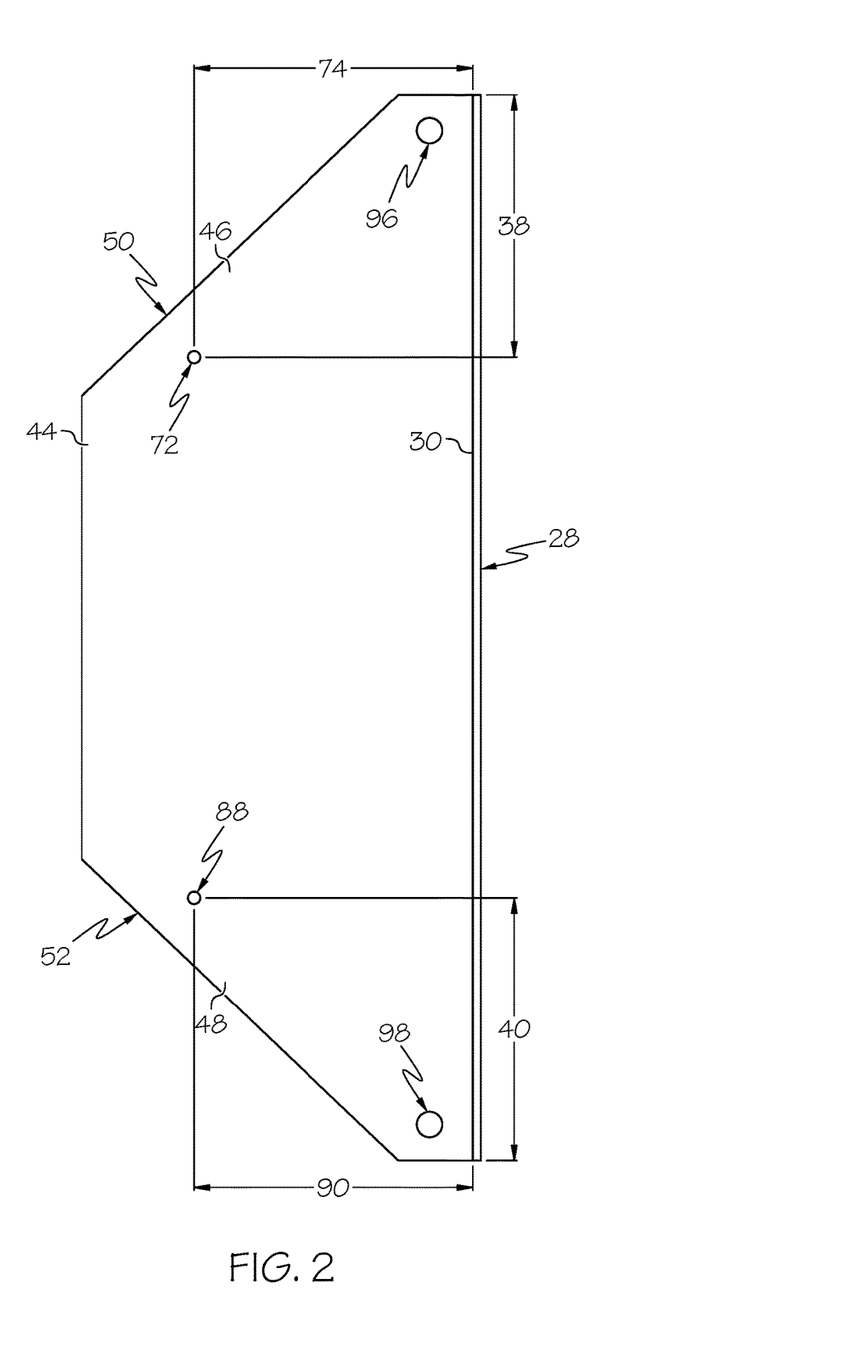
FIG. 2 is a right side elevation of an element of the invention.

Further, by shaping the sections as depicted in FIG. 2, extraneous material is eliminated from segment 44 while achieving the purposes of the invention. Additional material can be removed from segment 44 as shown, by reducing the amount of material between the openings 72 and 98 (see below).

The first securing means 24 includes a first captive fastening member mounting element 62 (see FIG. 1B), typically having a circular cross-section, and a first captive fastening member 64. The longitudinal axis of the mounting element 62 is angled from the second side wall 22 to the first sidewall 20 as shown. The first captive fastening member includes a head end 66 and a shaft segment 68. The shaft segment 68 is positioned within the mounting element 62. A snug-fit results. The first captive fastening member also includes a tip end 70.

Referring to FIG. 2, segment 44 of the shroud plate 26 is seen to include a first opening 72 positioned a distance 74 from the inside surface 30 of the first segment 28. This distance will vary depending on the manufacturing source of the junction box. As noted above, the location of the first captive fastening member mounting element, and the second captive fastening member mounting element (see discussion below), is typically molded onto the outside surface of the top wall 16 as part of the junction box. The distance 74 from opening 72, and 90 from opening 88 (see below), to the inside surface 30 of segment 28 will vary with the box manufacturer.

In assembly, when the junction box is positioned adjacent the shroud plate such that the rear wall 14 of the box is in near proximity to the inside surface 30 of the segment 28, the tip end 70 of the first captive fastening member 64 is aligned with the opening 72. The size of the opening in one embodiment of the invention is less than the diameter of the cross section of the shaft segment 68 such that a wedge fit occurs when the fastening member is urged along its longitudinal axis through mounting element members 62 until the tip engages and passes slightly through the hole. This in effect will secure the junction box to the shroud plate 26. This facilitates the subsequent mounting of the assembly to the supporting framing member such as wall stud 25.

In wood frame construction, the fastening member 64 used in conjunction with the typical plastic, junction box is normally a ten penny nail. This has a shank diameter of 0.148" and a shank length of nominally 3" for a single gang box. Given the shank diameter for the ten penny nail, the opening 72 would have a diameter less than the 0.148" so that in assembly, once again, the tip end 70 of the nail is captured within the opening 72 providing a practical means of affixing the junction box to the shroud plate 26, forming the assembly 10. Thus the subsequent installation to a wall stud, is simply the same experience of installing a junction box alone.

At the time the assembly 10 is put in place on the wall stud, the contractor locates the guide mark on the junction box for the particular sheetrock thickness (not shown), such as ¼ or ½ inch, against the face side of the stud and then hammers the nail head 66 with sufficient force to flare out the opening 72 to allow the passage there through of a portion of the shaft segment into the wall stud.

Typically a second securing means for attaching the assembly to the wall stud is provided. It includes a second captive fastening member mounting element 76 which is positioned on the outside surface 78 of the bottom wall 18. It includes a second captive fastening member 80. As above, it includes a head end 82 a shaft segment 84 having a prescribed cross sectional dimension corresponding to the fastening member's size, (for example a ten penny nail would have a shaft diameter of 0.148") positioned within the second mounting element 76, and a tip end 86. The second securing means further includes a second opening 88 positioned on the additional segment 44 at a distance 90 from the inside surface 30 of the first segment 28. The distance 90, like the distance 74, is set so that the tip end 86 is axially aligned with the opening 88 when the junction box is juxtaposed the inside surface 30. Again, this distance 90 will vary depending on a particular box manufacturer.

As with the first securing means, since it is desirable to facilitate the subsequent affixation of the assembly to the wall stud, the respective dimensions of the opening 88 and the shaft segment 84 are such that the opening captures and retains the tip end. Thus the assembly comprising the shroud plate and junction box can be installed in a single operation.

As explained above, the retention of the first and second fastening members 64 and 80 in the respective openings 72 and 88 rely on a wedge fit between the tip end of the respective fastening member and the corresponding opening. In FIG. 1A, a tack weld as depicted at 92 and 94 can be employed. This will insure that the shroud plate is held captive to the junction box as the assembly combination is handled from point of assembly through installation.

A degree of universality can be achieved by elongating the openings 72 and 88 to accommodate different box designs. The height of the slot would be something less than the diameter of the shank portion of the fastening member to allow for retention of the plate to the box. A tack weld or similar means may be employed to ensure the capture of the plate to the box.

Also, the holes can be made having a larger size opening to allow for misalignments of a small nature between the location of the shroud plate and the positioning of the box. The shroud plate might be first installed using an appropriately sized nail or screw placed through one or both of the mounting holes, 96 and 98; and then the junction box installed afterwards. This becomes a two-step process and, from a time to install perspective, is less desirable to the preferred approach.

Although the embodiment is described wherein nails are the specified fastening members, screws can be employed particularly where the mounting frame members are made of metal. If screws are used, each would provide the necessary retention force between the two elements of the assembly.

As required by the Code, a metal shroud plate should be 1/16" in thickness.

Figure 3:
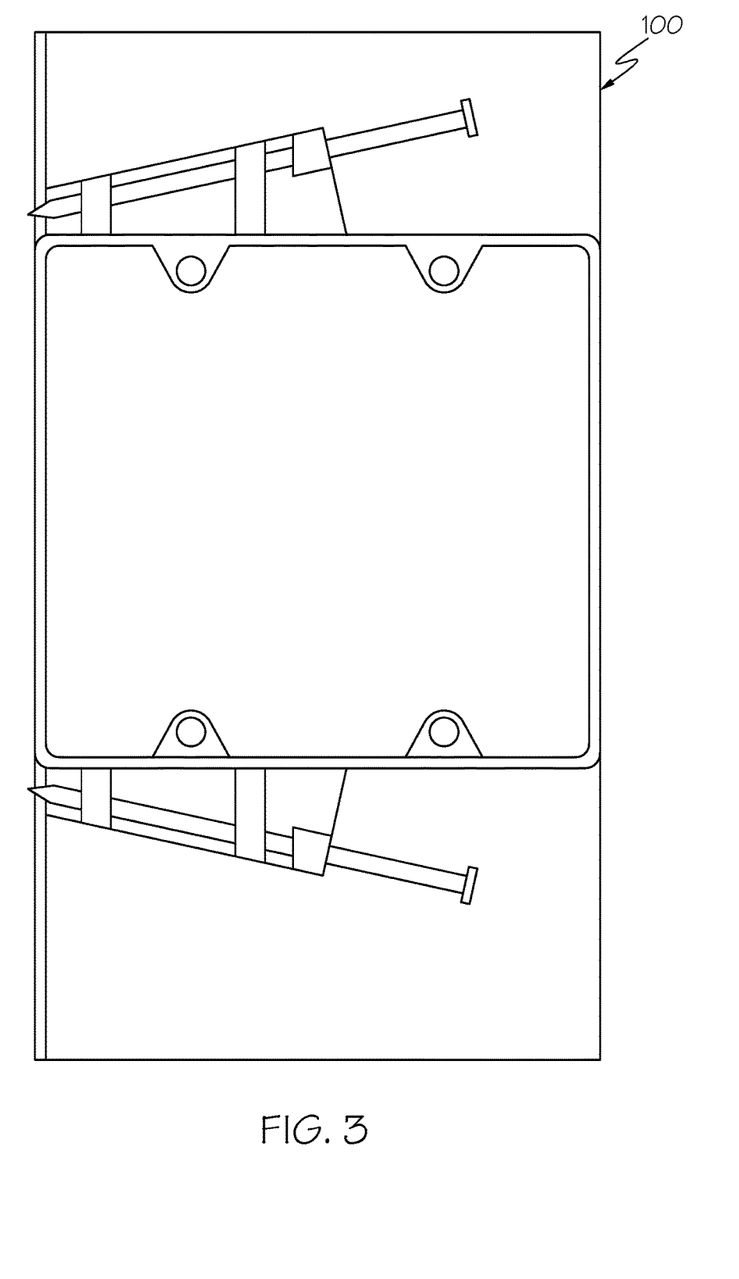
FIG. 3 is a front perspective view of the assembly for a two gang box.

The present invention can accommodate multiple size and style device boxes such as the "Dual Gang" box depicted in FIG. 3. Here the first segment 100 would typically be sufficient in width to cover the extended rear wall of the box—similarly for multiple gang boxes.

While the present invention has been described with particular reference to specific examples, it will be apparent to those skilled in the art that various changes and modifications may be made thereto.

What is claimed is:

1. An assembly for protecting an electrical junction box together with an array of one or more electrical cables connected to the junction box, said assembly comprising:
   (a) said junction box, having a rear wall, a top wall, a bottom wall, a first sidewall and a second side wall;
   (b) a shroud plate, said shroud plate having a first segment with an inside surface, said first segment including a first section that is coextensive with the rear wall of said junction box, and a second and third section extending from the first section, each of the second and third sections extending a respective predetermined distance above and below the top and bottom walls respectively;

said shroud plate having at least one additional segment extending at 90° from said first segment in the direction that the first sidewall extends from the rear wall of said junction box; and, (c) at least a first securing means including a first captive fastening member mounting element positioned on an outside surface of the top wall, a first captive fastening member including a head end, a shaft segment with a prescribed cross sectional dimension positioned within said mounting element and a first tip end, said at least a first securing means having a first opening positioned in said at least one additional segment at a predetermined distance from the inside surface of said first segment of said shroud plate sufficient for said first opening to align with said first tip end when the inside surface of said first segment of said shroud plate is in close proximity to the rear wall of said junction box and the first captive fastening member is positioned in the first captive fastening member mounting element, so that at a time of installing said assembly to a wall stud, upon applying an axial force to said first head end, said first captive fastening member is caused to move axially through said first opening, such that a portion of said shaft segment of the first captive fastening member engages the wall stud, whereby said assembly is secured thereto.

2. The assembly claimed in claim 1 wherein, said assembly further includes means to securely maintain an axial alignment of said first opening to said tip end.

3. The assembly claimed in claim 2 wherein said means to securely maintain an axial alignment of said first opening to said first tip end, is a tack weld between said first tip end and an immediately adjacent portion of said at least one additional segment.

4. The assembly claimed in claim 1 wherein said assembly further includes a second securing means for further securing said assembly to the wall stud, said second securing means having a second captive fastening member mounting element positioned on an outside surface of the bottom wall of said junction box, and a second captive fastening member including a second head end, a shaft segment with a prescribed cross sectional dimension positioned within said second mounting element, and a second tip end, said second securing means having a second opening positioned in said at least one additional segment at a predetermined distance from the inside surface of said first segment of said shroud plate sufficient for said second opening to align with said tip end of said second captive fastening member when the inside surface of said first segment of said shroud plate is in close proximity to the rear wall of said junction box and said second captive fastening member is positioned in the second captive fastening member mounting element, so that at a time of installing said assembly to the wall stud, upon applying an axial force to said second head end, said second captive fastening member moves axially through said second opening, such that a portion of said shaft segment of said second captive fastening member engages the wall stud, whereby said assembly is further secured thereto.

5. The assembly claimed in claim 4 wherein, said assembly further includes means to securely maintain an axial alignment of said second opening to said second tip end.

6. The assembly claimed in claim 5 wherein said means to securely maintain an axial alignment of said first and second opening to said respective first and second tip end, is a tack weld between said first and second tip end and a respective immediately adjacent portion of said at least one additional segment.

7. The assembly claimed in claim 1 wherein said shroud plate includes a second additional segment extending at 90° from said first segment in the direction that said first sidewall extends from the rear wall of said junction box, and, wherein said assembly further includes a second securing means for further securing said assembly to the wall stud, said second securing means having a second captive fastening member mounting element positioned on an outside surface of the bottom wall of said junction box, and a second captive fastening member including a second head end, a shaft segment with a prescribed cross sectional dimension positioned within said second mounting element, and a second tip end, said second securing means having a second opening positioned in said second additional segment at a predetermined distance from the inside surface of said first segment of said shroud plate sufficient for said second opening to align with said second tip end of said second captive fastening member when the inside surface of said first segment of said shroud plate is in close proximity to the rear wall of said junction box and said second captive fastening member is positioned in the second captive fastening member mounting element, so that at a time of installing said assembly to the wall stud, upon applying an axial force to said second head end, said second captive fastening member moves axially through said second opening, such that a portion of said shaft segment of said second captive fastening member engages the wall stud, whereby said assembly is further secured thereto.

8. The assembly claimed in claim 7 wherein, said assembly further includes means to securely maintain an axial alignment of said first and second opening to said respective first and second tip end.

9. The assembly claimed in claim 8 wherein said means to securely maintain an axial alignment of said first and second opening to said respective first and second tip end, is a tack weld between said first and second tip end and a respective immediately adjacent portion of said respective at least one additional segment and said second additional segment.

10. An assembly for protecting an electrical junction box made of plastic material and an array of one or more electrical cables connected to said junction box, said assembly comprising:

(a) said junction box, said junction box having a rear wall, a top wall, a bottom wall, a first sidewall and a second sidewall;

(b) a shroud plate, said shroud plate having a first segment with an inside surface, said first segment including a first section that is coextensive with the rear wall of said junction box, and a second and third section extending from the first section, each of the second and third sections extending a respective predetermined distance above and below the top and bottom walls respectively;

said shroud plate having an additional segment extending at 90° from said first segment in the direction that the first sidewall extends from the rear wall of said junction box;

(c) a first securing means including a first captive fastening member mounting element positioned on an outside surface of the top wall, a first captive fastening member including a first head end, a shaft segment with a prescribed cross sectional dimension positioned within said mounting element and a first tip end;

said first securing means having a first opening positioned in said additional segment at a predetermined distance from the inside surface of said first segment of said shroud plate sufficient for said first opening to align with said first tip end when the inside surface of said first segment of said shroud plate is in close proximity to the rear wall of said junction box and the first captive fastening member is positioned in the first captive fastening member mounting element, said first opening having a cross sectional dimension less than the cross sectional dimension of said shaft segment of said first captive fastening member, such that said first tip end is releasably captured within said first opening when said captive fastening member is positioned in a predetermined axial location within said first captive fastening member mounting element; and, (d) a second securing means including a second captive fastening member mounting element positioned on an outside surface of the bottom wall of said junction box, and a second captive fastening member including a second head end, a second shaft segment with a prescribed cross sectional dimension positioned within said second mounting element, and a second tip end, said second securing means having a second opening positioned in said additional segment at a distance from the inside surface of said first segment of said shroud plate sufficient for said second opening to align with said second tip end of said second captive fastening member when the inside surface of said first segment of said shroud plate is in close proximity to the rear wall of said junction box and said second captive fastening member is positioned in said second captive fastening member mounting element, said second respective opening having a cross-sectional dimension less than the cross sectional dimension of the shaft segment of said second captive fastening member, such that said second tip end of said second captive fastening member is releasably captured within said second opening when said second captive fastening member is positioned in a predetermined axial location within said second captive fastening member mounting element, so that at a time of installing said assembly to the wall stud, upon applying an axial force to said first and second head end, said respective first or second captive fastening member moves axially through said first or second opening, such that a portion of said shaft segment of said respective first or second captive fastening member engages the wall stud, whereby said assembly is secured thereto.

11. The assembly claimed in claim 10 wherein said respective means to securely maintain an axial alignment of said first and second opening to said respective first and second tip end, includes at least a tack weld between said respective first and second tip end and a respective immediately adjacent portion of said additional segment.

* * * * *